(12) United States Patent
Brissette (10) Patent No.: US 6,938,187 B2
(45) Date of Patent: Aug. 30, 2005

(54) TANDEM CONNECTION MONITORING

(75) Inventor: Patrice Brissette, Hull (CA)

(73) Assignee: Nortel Networks Limited, St. Laurent (CA)

(*) Notice: Subject to any disclaimer, the term of this patent is extended or adjusted under 35 U.S.C. 154(b) by 663 days.

(21) Appl. No.: 10/021,054

(22) Filed: Dec. 19, 2001

(65) Prior Publication Data

US 2003/0115307 A1 Jun. 19, 2003

(51) Int. Cl.⁷ .............................................. G06F 11/30
(52) U.S. Cl. ........................ 714/43; 714/47; 709/224
(58) Field of Search .............................. 714/4, 43, 47; 709/224; 370/242

(56) References Cited

U.S. PATENT DOCUMENTS

| | | | |
|---|---|---|---|
| 6,757,243 B1 * | 6/2004 | Chaudhuri et al. | 370/221 |
| 6,798,748 B1 * | 9/2004 | Hessler et al. | 370/242 |
| 6,807,152 B1 * | 10/2004 | Hessler et al. | 370/242 |
| 2002/0067698 A1 * | 6/2002 | Gourley et al. | 370/248 |
| 2003/0097472 A1 * | 5/2003 | Brissette | 709/245 |

FOREIGN PATENT DOCUMENTS

| EP | 0 964 543 A2 | 12/1999 |
|---|---|---|
| EP | 1 162 772 A | 12/2001 |

OTHER PUBLICATIONS

An Overview of ITU0T G.709, Agilent Technologies.*
A G.709 Optical Transbort Network Tutorial, Guylain Barlow, Product Manager, Innocor Ltd.*
"Tandem Connection Monitoring: Fundamentals, Operation, Test Solutions"—Wavetek Wandel Goltermann Communications Test Solutions—pp. 1–18.
"Network Node Interface For The Synchronous Digital Hierarchy (SDH)", ITU–T Recommendation G.707, XX, XX, Online! Mar. 1996, XP002259300 . . . .
"Interface For The Optical Transport Network (OTN)" ITU–T Recommendation G.709, XX, XX, Feb. 2001, pp. 1–80, XP002195641 . . . .

* cited by examiner

Primary Examiner—Scott Baderman
Assistant Examiner—Anne L. Damiano
(74) Attorney, Agent, or Firm—Dennis R. Haszko; Borden Ladner Gervais LLP

(57) ABSTRACT

Devices and methods for processing data transmission units (DTUs) that are either entering or exiting a network. A device having multiple processor modules is provided along with a controller and an interface for the multiple processors. Each processor can work on any one of the connection levels and can independently process incoming or outgoing DTUS. Each processor module can perform the required calculations and data manipulation required for BIP 8 calculation, binning, and trail trace identifier validation. The controller receives the incoming or outgoing DTUS and assigns these DTUS to the appropriate processor module that is working on that connection. Connections can be added or dropped as required by the controller which also handles the assignment of the processor modules to the connections. Furthermore, also provided is an offset scheme for the numbering of the connection levels that avoids a zero connection level that may arise due to an AIS event.

12 Claims, 5 Drawing Sheets

TANDEM CONNECTION MONITORING

FIELD OF THE INVENTION

This invention relates to computer networks and, more specifically, to devices and methods for monitoring the performance of multiple connections across a single network.

BACKGROUND TO THE INVENTION

The increasing spread of computer networks in business environments has led to a whole new set of issues regarding such networks. One main concern is the reliability and, therefore, the performance of such networks. It is currently a common practise to have multiple connections coming into and leading out of specific networks, so that multiple networks are be interconnected, with data from one network transiting through multiple other networks before arriving at its ultimate destination. One problem with this scenario is that, in transiting through a network, data may be corrupted thereby introducing errors in the data. Unfortunately, the error may have occurred in any one of the networks that the data has transited. It would be advantageous if it can be known in which intermediate network the corruption occurred.

To help in meeting the above need, such intermediate networks can be monitored for quality control. Essentially, this requires that data entering the network is checked as it enters the network and the same data is also checked as it exits the network. The two checks are then compared to determine if there is a difference between the two. If there is a difference, then errors have been introduced by the intermediate network. This data integrity check is necessary in many applications as it would be financially and commercially advantageous for network service providers to ensure that their segment on the network does not produce errors in data passing through it.

To this end, the International Telecommunications Union (ITU) has introduced the G.709 standard for "Interface for the Optical Transport Network (OTN)". This standard is a set of recommendations by the ITU. It provides for data encapsulation and for specific sections in that encapsulation for such data integrity checks. The recommendations provide for a specific frame structure that has a specific header with section in the header specifically tasked for containing error correction data.

One of these pieces of data for performance measurement is termed the trail trace identifier or TTI. This is defined to transport a 64 byte message that contains a source and a destination identifier used for routing the frame signal through the network. The TTI functionality allows for testing whether frames reach their desired output ports in the network.

For in service performance monitoring, the ITU G.709 recommendations use bit interleaved parity (BIP). Essentially, what this means is that for a specific group of data bits carried by the frame, a specific bit value is calculated and this bit value is stored within the frame carrying the data. Thus, a record of the data carried by the frame is also carried for error correction purposes. Upon exiting the network, a similar operation occurs wherein for each set group of data bits in the payload of the frame, a similar bit value is calculated. This bit value is then compared with the corresponding bit value carried by the frame. If these two bit values match, then the presumption is that no errors were introduced in the frame. However, if the two bit values do not agree, then the presumption is that an error has been introduced by the network that the data frame has just passed through.

Another feature of the G.709 recommendations is the provision for a four bit backward error indicator (BEI) that is used to signal upstream networks as to the number of bit errors per block that have been identified as errors by previous networks. Essentially what this means is that if errors have been detected using the BIP function, the number of bit errors per block is recorded using the BEI. Thus, if a frame enters a network, the network that is being entered knows how many errors are already existent within the frame. This definition for REI is for the SONET (Synchronous Optical Network) standard. For the SDH (Synchronous Digital Hierarchy) standard, the BEI is defined as the number of bit interleaved blocks that have errors.

Another feature of the G.709 recommendations is the provision for a backward defect indication (BDI). This is defined to convey the signal fail status determined in a section termination synchronization function in the upstream direction. This indication is set to one to indicate a defect otherwise it is set to zero. It should be noted that the BDI is a single bit.

It should also be noted that the G.709 recommendations provide for a maximum of six connections to be monitored through each entry or exit point. Thus, up to six connections may be entering through a specific entry point of a network. Conversely, up to six connections may be exiting from a network at an exit point. While more connections are possible, the recommendations only allow for up to six connections to be simultaneously monitored. It is this tandem connection monitoring that requires processing. Each connection that enters a specific entry point of a network must have its data frames checked for its BIP and the errors that the data frame may have. When that data frame leaves the network, it must again be monitored and checked for any errors that may have been introduced by the network. If such errors have been introduced then this must be reflected in the appropriate section in the frame.

Currently, the only solutions to monitoring the data frames entering and exiting a network are software based. However, such solutions are problematic as large amounts of processing power are required to accomplish this. Furthermore, the amount of bookkeeping that is required to monitor the connection entering and exiting a network can be extensive especially if implemented in software. Another major shortcoming of a software implementation is that software cannot be fast enough to process the data in real-time.

What is therefore required based on the above, is a hardware solution to implementing the G.709 recommendations. Such a hardware based solution would not only increase the speed required for processing the data frames through a network, it would also allow for easier implementation, as each hardware solution can be installed at each entry and exit point of a network.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets and frames that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another as a payload of a data transmission unit.

SUMMARY OF THE INVENTION

The present invention seeks to meet the above needs by providing devices and methods for processing data transmission units (DTUs) that are either entering or exiting a network. A device having multiple processor modules is provided along with a controller and an interface for the multiple processors. Each processor can work on any one of the connection levels and can independently process incoming or outgoing DTUS. Each processor module can perform the required calculations and data manipulation required for BIP 8 calculation, binning, and trail trace identifier validation. The controller receives the incoming or outgoing DTUS and assigns these DTUS to the appropriate processor module that is working on that connection. Connections can be added or dropped as required by the controller which also handles the assignment of the processor modules to the connections. Furthermore, also provided is an offset scheme for the numbering of the connection levels that avoids a zero connection level that may arise due to an AIS (Alarm Indication Signal) event.

In a first aspect, the present invention provides a device for processing data transmission units (DTUs) having encoded thereon data related to a performance of a network, the device including:
 at least two processor modules for processing the data;
 a controller for receiving the data, and controlling the at least two processor modules the controller having:
  a status register for recording availability of the at least two processor modules;
  a level register for recording a level at which a processor module is working; and
  a working register for recording a priority sequence of the at least two processor modules based on a level recorded in the level register;
 an interface coupled between the at least two processor modules and the controller, wherein commands and incoming data are received by the controller and are passed on to the at least two processor modules through the interface.

In a second aspect, the present invention provides a method for processing data transmission units (DTUs) the method comprising:
 a) receiving a DTU for processing by a processing unit;
 b) creating data relating to a payload of the DTU for use as an indication relating to a performance of a network through which the DTU is to transit;
 c) storing the data in the DTU;
 d) incrementing a tandem connection monitoring level for the DTU; and
 e) transmitting the DTU through the network for eventual transmission to a destination by a transmitting unit.

In a third aspect the present invention provides computer readable media having encoded thereon instructions relating to a method of processing data transmission units (DTUs), the DTUs having encoded thereon data related to the performance of a network, the method comprising:
 a) receiving a DTU for processing:
 b) extracting data related to a performance of a network from the DTU;
 c) transmitting the data to a processor module;
 d) performing a check on the data using the processor module to determine if the network has introduced errors to the DTU;
 e) decrementing a tandem connection monitoring level for the DTU; and
 f) transmitting the DTU to a subsequent network for eventual transmission to a final destination.

DESCRIPTION OF THE DRAWINGS

A better understanding of the invention may be obtained by reading the detailed description of the invention below, in conjunction with the following drawings, in which.

DETAILED DESCRIPTION

Figure 1:
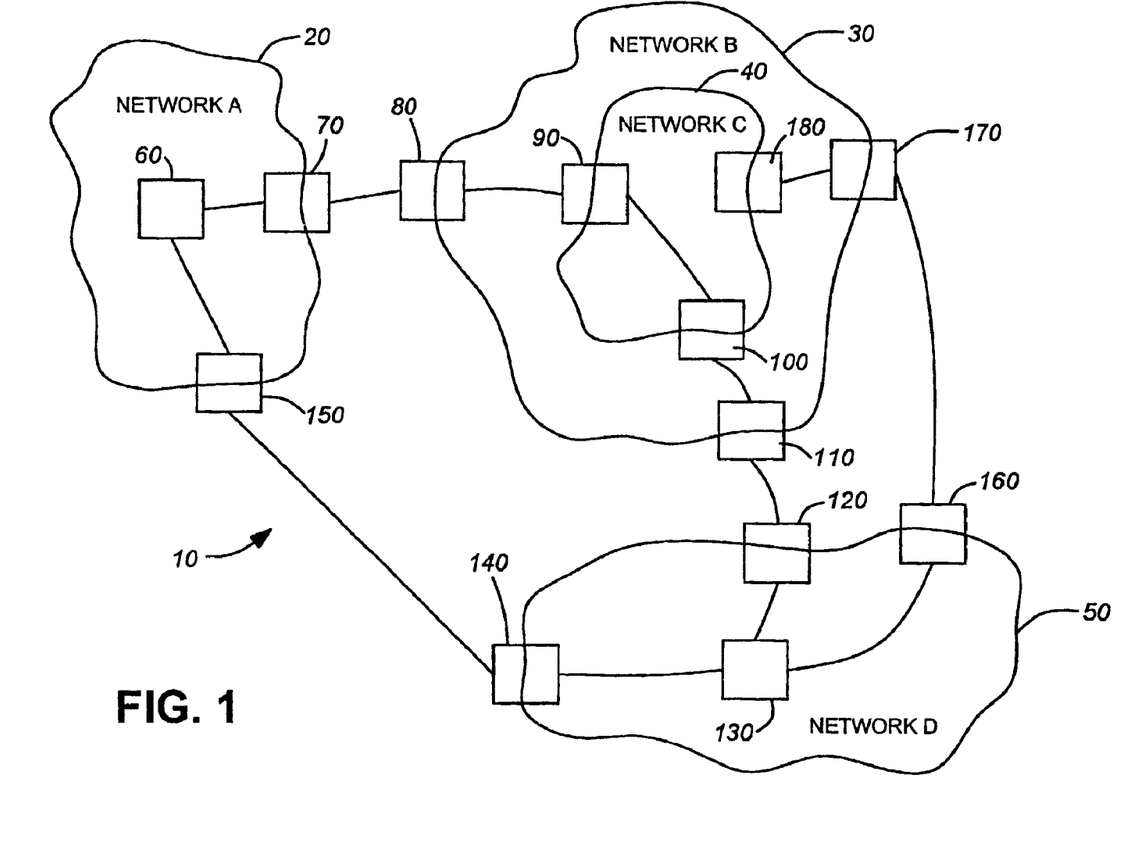
FIG. 1 is a block diagram illustrating a mesh of networks on which the invention may be applied.

It should be noted that all of the access points illustrated in FIG. 1 are bidirectional in that data can enter or leave a network by way of any of these access points. Thus, data can enter or leave network C by way of any of access points 90, 100, 180.

Referring to FIG. 1, a mesh 10 of multiple networks is illustrated. A network 20 is illustrated along with network 30, network 40 and network 50, network 40 is nested completely within network 30. Network 20 has an origin node 60 from which two links radiate. The first link connects origin node 60 with an access point 70 on the edge of network 20. This access point 70 of network 20 is connected to an access point 80 on the edge of network 30. Access point 80 of network 30 is also connected to access point 90 at the edge of network 40. Access point 90 on the edge of network 40 is also connected through the interior of network 40 with access point 100 at another access point on the edge of network 40. Access point 100 at the edge of network 40 is connected to access point 110 that is at another edge of network 20. This access point 110 is connected to access point 120 that is at the edge of network 50. Access 120 is connected to destination node 130 located within network 50. Destination node 50 is also connected to another access point 140 at another locus on the edge of network 50 which, in turn, is connected to a second access point 150 at another edge of network 20. This access point 150 is also connected to the origin node 60. Destination node 130 is also connected to a third access point 160 that is at a third edge of network 50. This access point 160 is connected to access point 170 at a third edge of network 30. Access point 170 is connected to access point 180 at an edge of network 40. This access point is connected to access point 170 through the interior of network 30.

The topology of the mesh 10 in FIG. 1 clearly illustrates the need for tandem connection monitoring. Essentially, if data is flowing from the origin node 60 to the destination node 130 by way of networks 30 and 40, then if errors are introduced into the data being transmitted, there must a mechanism that determine if the errors arose because of network 20, network 40 or network 50. As noted above, the ITU G.709 recommendation allows for the isolation of errors through the use of data transmission units. As a DTU enters network 30 through any one of its access points (access points 80, 110, or 170) a check is made to determine a BIP indication that is indicative of the data in the DTU. This BIP acts as a test for the data in the DTU. A value is calculated and stored using the data in the DTU. Correspondingly, when the DTU exits network 30 through some of its access points such as access point 80, 110, and 170, another check is made to determine if any errors have been introduced by the networks. The second check performs the same calculation on the data in the DTU. If the value calculated and the value stored from the previous calculation differ, then errors have been introduced.

To explain further, a DTU entering a network has a first check performed on it when the DTU enters the network. The second check is not performed until the DTU finally leaves the network. Referring to FIG. 1, the first check for a DTU entering network 30 is when the DTU enters at access point 80. The second check is not performed until the DTU leaves through access points 110 or 170. A second check is not performed when the DTU enters network 40 as network 40 is nested completely within network 20 and, as such, is still within network B.

It must be noted that even if a DTU does not transit through an intermediary network, error correction and/or error detection is still an important function. Thus, a DTU leaving the origin node 60 and being routed to destination node 130 by way of access points 150 and 140 can still take advantage of the data correction and/or error detection by checking the DTU to see if any errors have been introduced by the destination network. Essentially, what this means is that in transiting from access point 140 to destination node 130, network B may have introduced errors into the DTU. Thus, a data correction and/or error detection scheme can also be implemented at destination node D to check if the data correction and/or error detection introduced and determined at access point 140 remains intact.

To further explain the G.709 recommendations, part of the recommendations involve what are termed as TCM (Tandem Connection Monitoring) levels. Essentially, a TCM level is a level at which a connection is operating through a network. To assist in error correction/detection, G.709 recommends having specific areas in the headers of the DTU, in this case frames, specifically tasked to contain error correction/detection data for the network through which the DTU is currently transiting. The G.709 recommendations recommend six areas in the DTU header that can contain such error correction/detection data. For every network that the DTU is transited through one of these areas is filled as the DTU enters the network. When the DTU exits the network, the area that has been filled for that specific network is checked and emptied prior to it leaving the network. Each one of the TCM levels in the G.709 recommendations corresponds to one of these areas in the DTU header. The TCM levels work in the manner of a stack to allow for the nesting of networks. What this means is that, referring to FIG. 1, a DTU entering network B through access point 80 would be allocated TCM level 1 and the area in the DTU header corresponding the TCM level 1 would be populated by the error correction/detection calculated for the DTU as it enters network B. When that same DTU enters network C by way of access point 90, then TCM level 2 is added to the DTU. The area in the DTU header corresponding to TCM level 2 is then populated with the error correction/detection data that is calculated for that DTU as it enters network C. The addition of TCM level 2 to the DTU does not affect TCM level 1 as TCM level 1 is beneath TCM level 2 as if in a stack. Once the DTU exits network C by way of access point 100 or access point 180, the data related to the TCM level 2 that has been added will be examined and checked to see if network C introduced any further errors as it transited through network C. Prior to the DTU leaving network C the area in the DTU header occupied by error correction/detection data for TCM level 2 will be deleted. Again, this deletion does not affect the data in TCM level 1. Since the data related to TCM level 2 had been deleted at access point 100 for this DTU, then the operative TCM level for that DTU is again TCM level 1. This is consistent with the fact that at this point the DTU is now transiting again through network B. When the DTU exits network B through access point 110 on its way to access point 120 then the error correction/detection data that is in the area for TCM level 1 will therefore be deleted prior to the DTU leaving the network B. Of course, prior to this deletion this data will be checked to see whether network B introduced any errors into the DTU as it transited through network B.

Figure 2:
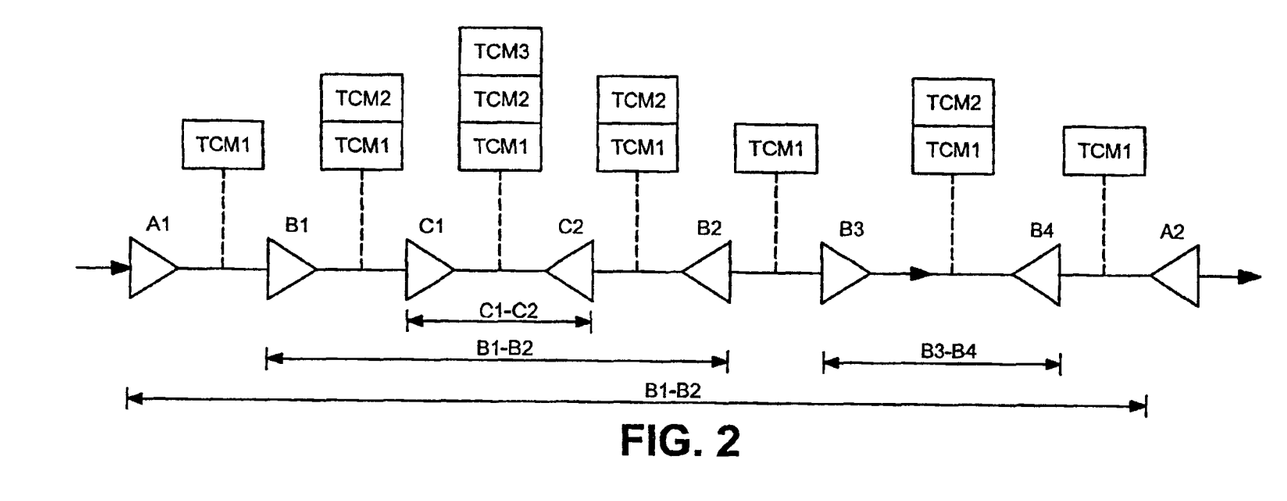
FIG. 2 is a block diagram illustrating the stackable quality of TCM levels.

To further clarify the above, each TCM area in the DTU header, also called TCM fields, will contain the following subfields: trail trace identifier (TTI), bit interleaved parity 8 (BIP-8), backward defect indication (BDI), backward error indication (BEI), incoming alignment error (IAE), and a field reserved for future international standardization (RES). The provision for six TCM levels in each DTU allows for the nesting of networks to a total of depth of six nested networks. As FIG. 2 illustrates, as a DTU enters a nested network, a new TCM level is added to the TCM stack. In FIG. 2, A1, B1, C1, and B3 correspond to the entry points for a number of networks. The entry point A1 corresponds to the exit point A2 while entry B1 corresponds to the exit point B2 and entry point C1 corresponds to exit point C2. Also, entry B3 corresponds to exit point B4. As can be seen, when a DTU enters a network through an entry point A1, then the TCM level 1 will be added to the DTU. As the DTU enters entry point B1, then TCM level two is added on top of TCM level one. Similarly, as the DTU enters the entry point C1, a third TCM level, TCM level 3 is added on top of the pre-existing TCM 1 and TCM 2. When the DTU exits through exit point C2, then TCM 3 is removed from the stack and similarly, when the DTU exits through exit point B2, then TCM 2 is removed from the stack leaving only TCM 1. Again, when the DTU enters entry point B3 then TCM 2 is added to the stack once again. When the DTU exits through exit point B4, then TCM 2 is removed from the stack leaving only TCM 1. When the DTU exits through exit point A2 then TCM 1 is removed from the stack leaving no TCM levels.

At each entry point, calculations are required to determine the data that must be inserted into the TCM fields in the DTU header. At each exit point, further calculations are required to determine whether the data contained in the TCM field to be deleted is still valid. If the calculation carried out on the DTU payload does not correspond to the data that was inserted into the header as the DTU enters the network, then the network has introduced errors into the payload. From this, it should be clear that processing is required at each entry and exit point in the network. At each entry point into the network TCM levels are added while at each exit point of the network TCM levels are discarded.

As part of the processing for both entry and exit points in the network, the TTI (trail trace identifier) bytes can be stored in the DTU header. Such bytes, stored in the entry points of the network and checked at the exit points, ensure that the DTU is being routed to the proper access points for exiting the network and, ultimately, to the proper next network in the sequence.

From the above it should be clear that when a DTU arrives at a network, that network should be informed of a TCM level at which a DTU is operating. In other words, the network has to be informed of the top of stack (TOS) for that DTU. A TOS is essentially the highest TCM level at which the DTU is operating. The network needs to know this information so that the network that is being entered can add a TCM level for itself to the incoming DTU.

Figure 3:
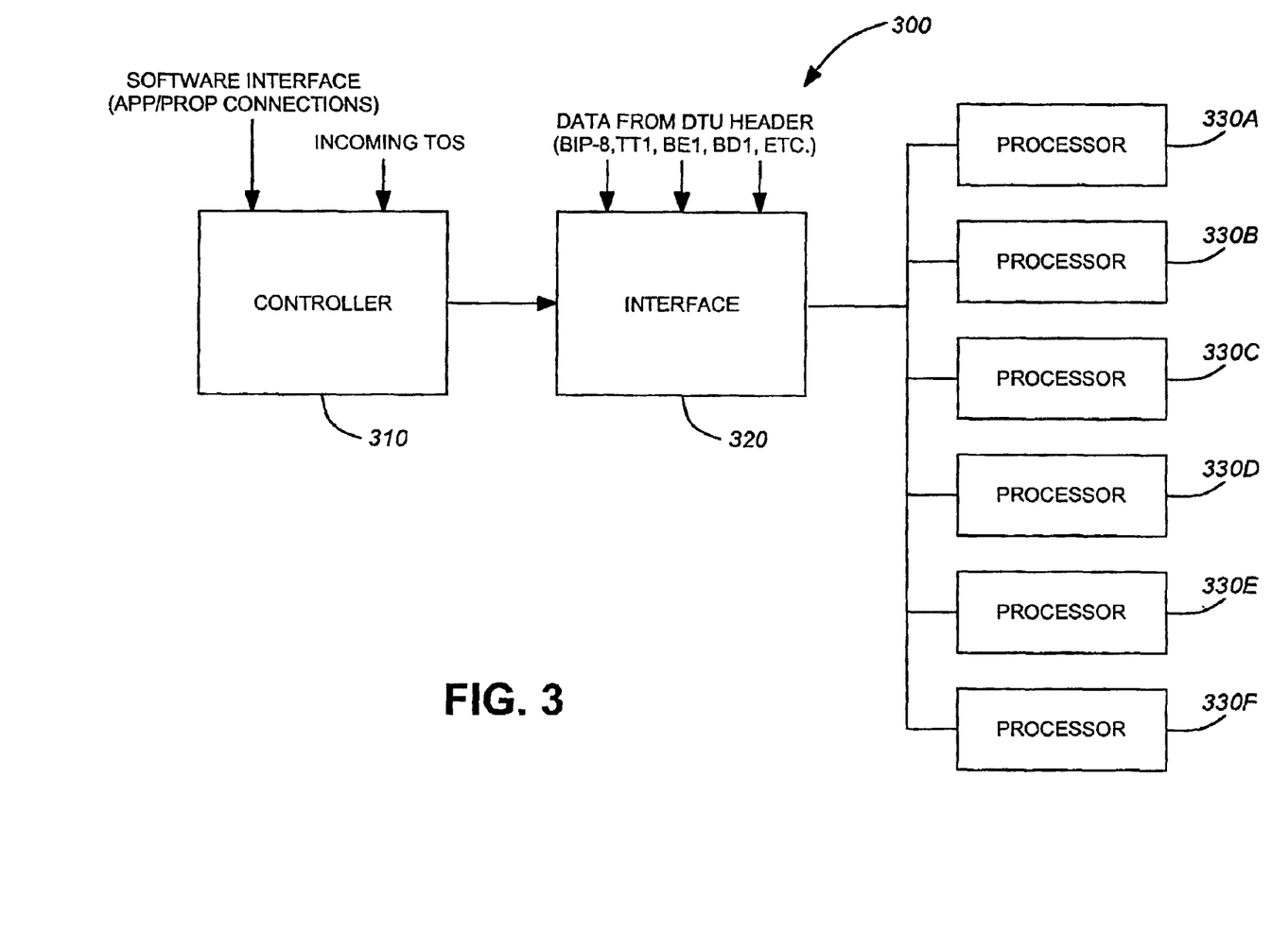
FIG. 3 is a block diagram for a device which may be used at the access points on the networks in FIG. 1.

Referring to FIG. 3, a block diagram of device for processing DTU headers is illustrated. A system 300 consists of a controller 310, an interface 320, and plurality of processor modules 330A, 330B, 330C, 330D, 330E, and 330F. The interface is coupled between the processor modules and the controller 310. The controller receives the incoming TOS along with inputs from a software interface through which connections can be added or dropped for the access point at which the system 300 is installed. The interface receives data from the DTU header for processing. Such data can be BIP-8, TTI, BEI, BDI, from the TCM fields of a DTU header. The plurality of processor modules 330A–330F perform the actual processing required for the data from the DTU header while the controller 310 receives the incoming TOS and manages the processor modules. The interface acts as a "translator" for the processor modules such that the processor modules know if they are assigned a specific task or not. Essentially, when some processing has to be performed the controller receives the "request" for processing and determines which resources processor modules are available. The controller then determines which processor module should be tasked with the request and allocates that processor module as being occupied. This indication is then transmitted to the interface which actually receives the data for processing. The interface then receives the data and routes it to the relevant processor module that is indicated by the controller. The interface merely takes commands from the controller and passes such instructions onto the processor modules.

Figure 4:
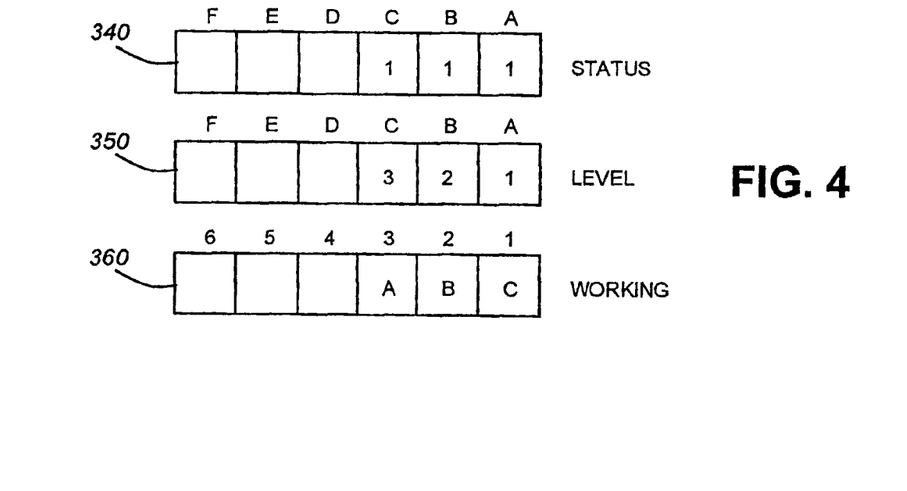
FIG. 4 illustrates the three registers by the controller of the device in FIG. 3.

Referring to FIG. 4, illustrated in block diagram are the registers that are at the heart of the controller. These registers are as follows: a status register 340, a level register 350, and a working register 360. The status and the level registers work hand in hand in that each column for both the status and the level registers correspond to a specific processor module. Thus, the right most column for both status and the level register correspond to processor 330A, while the column next to it corresponds to processor 330B and so on. The status register 340 keeps track of which processors are currently in use while the level register 350 keeps track of which TCM level a specific processor is working on. Thus, from FIG. 4, it can be seen that processor 330A is active and/or occupied as indicated by the 1 in the right most status register entry and that this processor module is operating on TCM level 1 as can be seen by the 1 in the right most entry in the level register. Similarly, processor module 330B is occupied and/or allocated and is working on TCM level 2 while processor module TCM 3 is working on TCM level 3 and is also occupied. The lack of entries in the last three entries in both status and level registers indicate that processor modules 330D, 330E, 330F are not occupied. The working register 360 indicates the order in which the processor modules are working in terms of their TCM levels. For FIG. 4, the processor module that is working at the highest TCM level is at the rightmost.

For the controller to perform its functions a software interface is required. To assist in the comprehension of the following explanation for this software interface, it should be noted that each device has a receive side and a transmit side regardless of key devices installed for an entry point or and exit point for a network. Essentially, in the device the internal receives side receives the data and the DTU for processing. The transmit side transmits the DTU and its processed header and TCM level to either the interior of the network or to another access point for another network. Essentially, if the device is installed at an exit point of a network then the receive side will receive the DTU with the TCM level for the network to be exited to be still intact. After the processing of the DTU and its header, the transmit side will transmit the DTU with the TCM level for the network being exited already deleted. Conversely, if the device is installed as an entry point for a network, the receive side will receive the DTU with the TCM level at the TOS the previous network. After the processing of the DTU, the amended header for the DTU will have a new TCM level on top of the TCM level for the previous network. It is this header that has the additional TCM level that is to be transmitted by the transmit side of the device. The software interface works as follows.

In order to add or delete a connection, the controller must execute internally the following commands:

1) WAIT_COMMAND
2) VERIFICATION
3) FIND_PROCESSOR
4) BUILD_LEVEL
5) RESHUFFLE_WORK

WAIT_COMMAND: In this state, the controller waits for a command from the Software interface.

VERIFICATION (Validation): During this step, the controller validates each command requested by a network operator. The controller performs different checks depending on whether the network operator is adding or deleting TCM connections.

The following are the checks performed when adding a TCM connection:

is a processor available;
are all connection levels between TCM 1 and TCM 6;
is the incoming connection level NOT below the lowest TCM level (a transparent level may exist);
connection level NOT above 2 levels of the highest TCM level (level exceeds TOS=TOS+1);
no processor already working on TCM6.

When deleting a TCM connection, the controller checks to see if there is a processor which is working on the level to be deleted.

If one of these conditions are not met during verification, a command error message is generated and the command request is aborted.

The only way to deallocate a processor working on a TCM level is by deleting the connection using the delete command. An incoming TOS cannot turn off a processor.

FIND_PROCESSOR: During this step, the controller finds the first available processor based on the status control register. In the case of a delete command, the controller finds the processor to be deallocated.

BUILD_LEVEL: During this step, the controller reassigns each allocated processor to work on a TCM level based on the new processor to be allocated. A particular processor may simply continue to work on the same TCM level or be switched to another one.

It is essential that the controller handles all processors and their TCM levels on a continuous basis. By continually updating the statuses of processors and TCM levels, the controller avoids errors with BIP-8 calculation and bining that can result because BIP-8 calculation and bining are continually calculated over the same physical connection which may change level during use.

Deleting a connection (deallocating a processor) is done in much the same way.

RESHUFFLE_WORK: During this step, the controller rebuilds the Working control register by determining the order of processors from the highest to the lowest TCM level.

This register is very important for handling every incoming TOS. In this state, the controller creates a temporary register that it will copy back during the next state. The controller also generates the working control registers by shifting the number of bits indicated by a predetermined value. The controller then generates all three control registers by copying back temporary registers and then enabling the proper processors. The controller then resets the temporary registers to zero for next time.

The following example illustrates what is happening internally when a connection is added. In this example, it is assumed that there are already two connections (level 3 and 4) and a request is received to add another level 3.

Because there is already a connection at level 3, the level 3 connection already allocated is pushed up to level 4. Likewise, the one on level 4 is pushed up to level 5. Finally the new request (level 3) is added at level 3.

Before the new request is added, the control registers have the following values:

0-0-0-0-1-1: Status
0-0-0-0-4-3: Level
0-0-0-0-A-B: Working

Step 1 VERIFICATION: Pass all criteria;
Step 2 FIND_PROCESSOR: First available processor is C;
Step 3 BUILD_LEVEL: Temporary Level control register is created
0-0-0-3-S-4: Temp Level;
Step 4 RESHUFFLE_WORK: Temporary Working control register is created;
0-0-C-A-B-0: Temp Working;
WORK_SHIFT_VALUE: shift value is 4 bits on the right;
COPYBACK_ENABLE: New control registers look like:
0-0-0-1-1-1: Status
0-0-0-3-5-4: Level
0-0-0 -C-A-B: Working.

Deleting a connection is done in much the same way.

In order to avoid timing problems with other activities on the control registers, add and delete connection handling occurs only at specific timeslots.

Note: When adding a new connection, it is preferable to add the receive side before adding the transmit side since the receive side cares about the incoming TOS. For this reason, it is better to allocate the connection before receiving the new TOS level.

Incoming TOS Processing

Another important feature of TCM processing is the management of the incoming TOS (top of stack).

Again, the controller must execute a series of commands for each incoming TOS. The TOS for the Wrapper transmit side differs from that of the Wrapper receive side. On the transmit side, TOS values are received (decremented TOS) from the receive side. On the receive side, TOS values are received from the link. These TOS values are not the same as the ones received on the transmit side.

WRX (receive side):
1 WMT_NEXT_TOS
2 PROCESS_HAMMING_TOS
3 INCOMING_TOS_TREATMENT
4 UPDATE_CONTROL_REGISTERS
5 TRANSMIT_DECREMENTED_TOS WAIT_NEXT_TOS: In this state, the controller waits for a specific predetermined timeslot. When the predetermined timeslot arrives, the incoming TOS value is now valid and ready for processing.

PROCESS_HAMMING_TOS: The encoded TOS value is decoded. The coding used is an extended Hamming code.

INCOMING_TOS_TREATMENT: This command adjusts the Level and Working control registers based on the incoming TOS.

UPDATE_CONTROL_REGISTERS: This command updates the Level and Working control registers (copies the values from temporary registers).

TRANSMIT_DECREMENTED_TOS: This command generates the decremented TOS value to be sent to the WTX side.

WTX (transmit side):
1 WAIT_TOS
2 DECREMENTED_TOS_TREATMENT1
3 DECREMENTED_TOS_TREATMENT2
4 DECREMENTED_TOS_TREATMENT3
5 DECREMENTED_TOS_TREATMENT4
6 UPDATE_CONTROL_REGISTERS
7 GENERATE_OUTGOING_TOS WAIT TOS: In this state, the controller waits for a specific timeslot. Once this specific timeslot arrives, the incoming TOS value is now valid and ready for processing.

DECREMENTED_TOS_TREATMENTi: This command finds the processor working on the lowest TCM level.

DECREMENTED_TOS_TREATMENT2: This command determines the higher TCM level to be processed, based on the result of the previous command and on the Working control registers.

DECREMENTED_TOS_TREATMENT3: This command validates the higher TCM level (ensures the value are between TCM 1 and TCM6) and sets the incoming TOS value to this level.

DECREMENTED_TOS_TREATMENT4: This command readjusts the Working and Level control registers based on the incoming TOS generated by the previous command.

UPDATE_CONTROL_REGISTERS: This command updates both registers using values stored in the temporary registers.

GENERATE_OUTGOING_TOS: This command encodes the incoming TOS with Hamming code. The incoming TOS is used to update the Working and Level control registers.

Note: An offset is applied (+7) to every TCM level. For example, level 1 is handled internally as level 8.

TABLE 1

| Internal TOS values | |
| --- | --- |
| Level | TCM Level |
| 14 | overflow |
| 13 | TCM 6 |
| 12 | TCM 5 |

TABLE 1-continued

Internal TOS values

| Level | TCM Level |
|---|---|
| 11 | TCM 4 |
| 10 | TCM 3 |
| 9 | TCM 2 |
| 8 | TCM 1 |
| 7 | MS (maintenance signal) |
| 6 | underflow |
| 5 | underflow |
| 4 | underflow |
| 3 | underflow |
| 2 | underflow |
| 1 | underflow |

The reason for the offset is mainly due to the maintenance signal failures processing. Under MS (maintenance signal), for example, some TCM connections may be temporarily inactive but should back up when the system recovers from the failure.

Consider a situation where there are 3 levels of connections working (TCM 1–TCM3) and an MS occurs on the receive side. Since the framer on the receive side is not able to frame, the incoming TOS will be equal to 0. As a result, all TCM connections will be moved down.

If old TOS values are stored, all TCM levels will need to function on TCM 0. This is unacceptable as Level 0 indicates that the processor is no longer working or has been deallocated. It is to avoid this eventuality that the offset was implemented.

When the MS is cleared, all TCM connections should be restored. However, since the system is based on Level and Working control registers, the controller cannot restore the connections because there is no way of knowing which processor was working on which specific level. All TCM values are equal to zero inside the level and working control registers.

With an offset, all processors still have a level to work on. These levels will be underilow. However, it will be clear which processor is working on a specific level.

When the MS is generated, the processor working on TCM 1 (level 8) will be pushed down to level 5. The processor working on TCM 2 (level 9) will be pushed down to level 6 and so on.

Once the MS is cleared, all TCM levels will be restored to their previous levels by the incoming TOS (which is TOS 3 converted to level 9).

Figure 5:
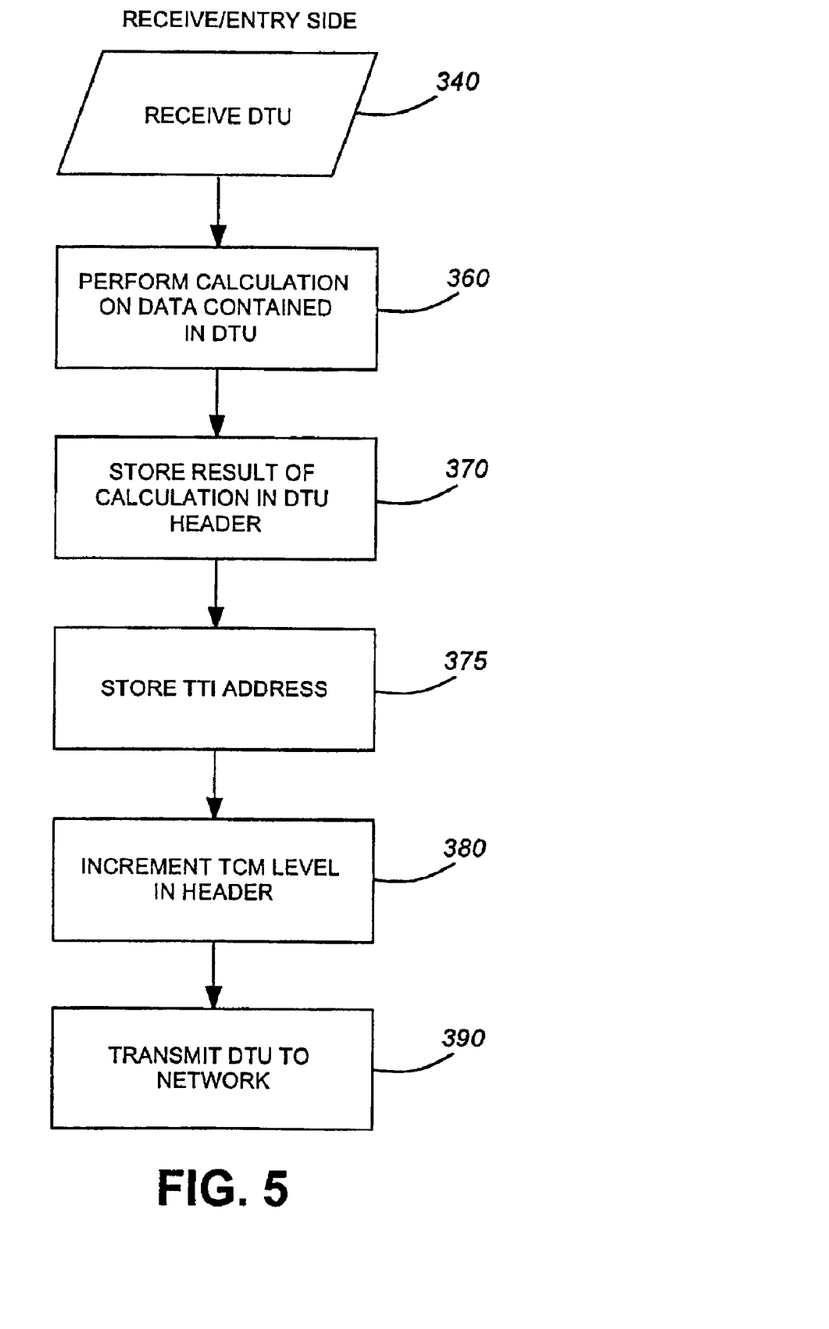
FIG. 5 is a flowchart detailing the steps executed in a process for DTUs entering a network.

Referring to FIG. 5, a flow chart illustrating the steps taken in the process according to the invention is illustrated. FIG. 5 illustrates the steps executed by a DTU processor at the receive or the entry side of a network. Essentially, these steps are executed whenever a DTU is received at an entry point to a network. The process begins with step 340 after receiving the DTU from another network. Step 360 is that of performing the calculation on the data contained in the DTU or on the data payload of the DTU. As explained above this calculation can take the form of a bit interleaved parity calculation. This bit interleaved parity calculation can be a BIP-8 calculation that is well known in the field. Step 370 then stores the result of this calculation in the DTU header for checking when the DTU leaves the network. Step 375 stores the TTI bytes (destination address) in the DTU header for checking when exiting the network. Step 380 is then that of incrementing the TCM level in the header of the DTU. By incrementing the TCM level in the header the presence of another network is thereby accounted for. The final step in the flow chart is that of step 390 and this is that of transmitting the DTU to the interior of the network through which the DTU will be transiting.

Figure 6:
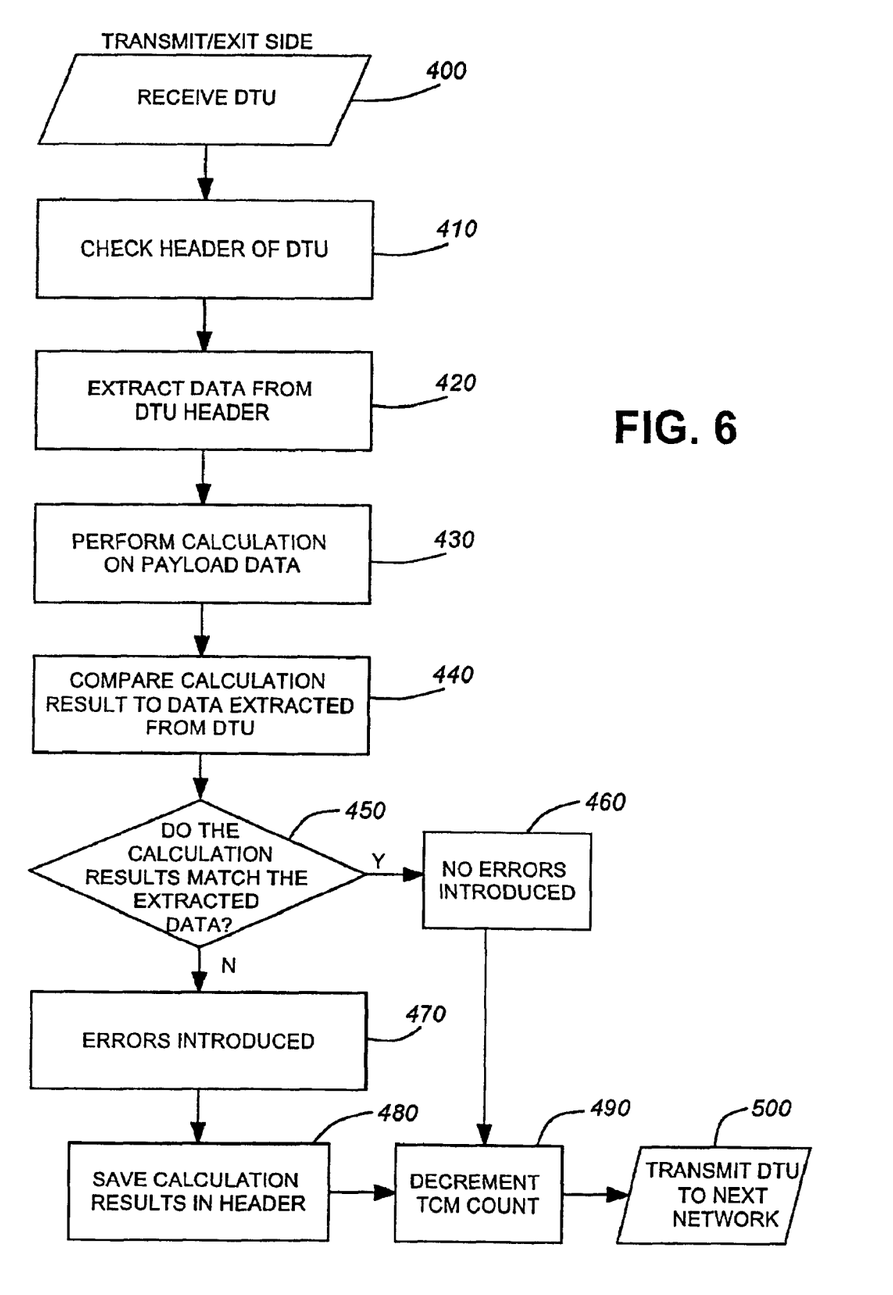
FIG. 6 is a flowchart detailing the steps executed in a process for DTUs exiting a network.

Referring to FIG. 6, a flow chart of the steps taken by the processor for a DTU exiting the network is illustrated. These steps are executed when a DTU is about to exit a network that it has just transited. The first step in this process is that of receiving the DTU from the interior of the network that is about to be exited. Step 410 is that of checking the header of the DTU to determine that, once again, it is not suffered any undue damage. Step 420 is that of extracting data from the DTU header. This data is the same data that was inserted into the header when the DTU entered the network. Step 430 is that of performing the calculation on the payload data similar to the calculation performed in step 360 of the previous flow chart. Again this calculation, which can take the form of a bit interleaved parity calculation much like the BIP-8 known in the filed, will result in a specific value that is indicative of the payload data. Step 440 is that of comparing the calculation result arrived at step 430 with the data extracted from the DTU in step 420. Also subsumed in step 440 is the checking of the TTI bytes in the DTU header. This is done to ensure that the DTU is being routed to its proper end destination. Thus, the TTI in the DTU header should match the expected TTI. Step 450 determines if the calculation results match the extracted data. If the calculations results match the extracted data then, as shown in 460, no errors were introduced by the network through which the DTU has just transited. On the other hand, if the calculation results did not match the extracted data, then errors have been introduced as illustrated in step 470. Step 480 then saves the calculation results in the header and indicates in the header that errors have been introduced into the payload data by the network that has just been transited. Step 490 is the next step after either of steps 480 or 460. This step 490 documents decrementing the TCM level or TCM count. This step merely keeps track of the fact that a network has just been exited and that one layer has been removed from the TCM stack. The final step, step 500, is that of transmitting the DTU to the next network in the DTUs path.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention.

I claim:

1. A device for processing data transmission units (DTUs) having encoded thereon data related to a performance of a network, the device including:

at least two processor modules for processing the data;

a controller for receiving the data, controlling the at least two processor modules the controller having:

a status register for recording availability of the at least two processor modules;

a level register for recording a level at which a processor module is working; and a working register for recording a priority sequence of the at least two processor modules based on a level recorded in the level register;

an interface coupled between the at least two processor modules and the controller, wherein commands and incoming data are received by the controller and are passed on to the at least two processor modules through the interface.

2. A device as in claim 1 wherein the level register records a TCM (tandem connection monitoring) level at which a processor module is working.

3. A device as in claim 1 wherein the data is encoded in a header of the DTUs.

4. A device as in claim 1 wherein the processor modules perform bit interleaved parity calculations on a payload of the DTU.

5. A method for processing data transmission units (DTUs) to monitor the performance of multiple connection across a single network, the multiple connection being made through access points of the network, the method being performed at the access point, the method comprising:

a) receiving a DTU for processing;

b) creating data relating to a payload of the DTU for use as an indication relating to a performance of a network through which the DTU is to transit;

c) storing the data in the DTU;

d) incrementing a tandem connection monitoring level for the DTU; and e) transmitting the DTU through the network for eventual transmission to a destination.

6. A device as in claim 5 wherein the data is stored in a header of the DTU.

7. A device as in claim 5 wherein the tandem connection monitoring level for the DTU uses an offset internal to a device executing the method.

8. A method as in claim 5 wherein the data created in step b) is created using bit interleaved parity calculations.

9. Computer readable media having encoded thereon instructions relating to a method of processing data transmission units (DTUs), to monitor the performance of multiple connection across a single network, the multiple connection being made through access points of the network, the method being performed at the access point, the DTUs having encoded thereon data related to the performance of a network, the method comprising:

a) receiving a DTU for processing:

b) extracting data related to a performance of a network from the DTU;

c) transmitting the data to a processor module;

d) performing a check on the data using the processor module to determine if the network has introduced errors to the DTU;

e) decrementing a tandem connection monitoring level for the DTU; and f) transmitting the DTU to a subsequent network for eventual transmission to a final destination.

10. The computer readable media of claim 9 wherein the data is stored in a header of the DTU.

11. The computer readable media of claim 9 wherein step d) is accomplished by performing bit interleaved parity calculations on a payload of the DTU and comparing a result of the calculations with the data.

12. The computer readable media of claim 9 wherein the tandem connection monitoring level for the DTU uses an offset internal to a device executing the method.

* * * * *

UNITED STATES PATENT AND TRADEMARK OFFICE
CERTIFICATE OF CORRECTION

PATENT NO. : 6,938,187 B2  
APPLICATION NO. : 10/021054  
DATED : August 30, 2005  
INVENTOR(S) : Patrice Brissette It is certified that error appears in the above-identified patent and that said Letters Patent is hereby corrected as shown below:

Column 3, line 55, delete "by a transmitting unit" and insert --.-- after the word 'destination';

Column 4, lines 26-30, delete "It should be noted that all of the access points illustrated in FIG. 1 are bidirectional in that data can enter or leave a network by way of any of these access points. Thus, data can enter or leave network C by way of any of access points 90, 100, 180." and therefor insert this paragraph in Column 5, line 12, after the word --introduced.--;

Column 4, line 58, delete "30" and insert therefor --B--;

Column 9, line 3, delete "during use" and insert therefor --on the fly--;

Column 10, line 23, delete "WTX" and insert therefor -- Wr)c --;

Column 11, line 28, delete "If old TOS values are stored" and insert therefor --If we store old TOS values,--;

Column 14, line 6, claim 6, delete "device" and insert therefor --method--;

Column 14, line 7, claim 7, delete "device" and insert therefor --method--;

Column 14, line 19, delete "the performance" and insert thereof --a performance--.

Signed and Sealed this

Twenty-second Day of August, 2006

JON W. DUDAS  
*Director of the United States Patent and Trademark Office*

UNITED STATES PATENT AND TRADEMARK OFFICE
CERTIFICATE OF CORRECTION

PATENT NO. : 6,938,187 B2 Page 1 of 1
APPLICATION NO. : 10/021054
DATED : August 30, 2005
INVENTOR(S) : Patrice Brissette It is certified that error appears in the above-identified patent and that said Letters Patent is hereby corrected as shown below:

Column 13, line 25, claim 1, delete "through" and insert therefor --by--;

Signed and Sealed this

Second Day of January, 2007

JON W. DUDAS
*Director of the United States Patent and Trademark Office*